United States Patent
Cai et al.

(10) Patent No.: US 8,935,413 B2
(45) Date of Patent: Jan. 13, 2015

(54) DELIVERY REPORT FOR TEXT MESSAGES IN SIP COMMUNICATIONS

(75) Inventors: Yigang Cai, Naperville, IL (US); Suzann Hua, Lisle, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 374 days.

(21) Appl. No.: 12/912,562

(22) Filed: Oct. 26, 2010

(65) Prior Publication Data

US 2012/0099524 A1    Apr. 26, 2012

(51) Int. Cl.
| G06F 15/16 | (2006.01) |
| H04L 12/58 | (2006.01) |
| H04W 4/14 | (2009.01) |

(52) U.S. Cl.
CPC ........ H04L 12/5875 (2013.01); H04L 12/5895 (2013.01); H04L 51/30 (2013.01); H04L 51/38 (2013.01); H04W 4/14 (2013.01)
USPC ............ 709/228; 709/238; 709/227; 370/356

(58) Field of Classification Search
USPC .................. 370/356; 709/227, 228
See application file for complete search history.

(56) References Cited

U.S. PATENT DOCUMENTS

| 2007/0156909 | A1* | 7/2007 | Osborn et al. | 709/227 |
| 2007/0254648 | A1* | 11/2007 | Zhang et al. | 455/433 |
| 2008/0159276 | A1* | 7/2008 | Kuusinen et al. | 370/356 |
| 2009/0083364 | A1* | 3/2009 | Kitamura | 709/201 |
| 2009/0156242 | A1* | 6/2009 | Wang | 455/466 |
| 2009/0221310 | A1 | 9/2009 | Chen et al. | |
| 2009/0303875 | A1* | 12/2009 | Matsumura | 370/230 |
| 2009/0327516 | A1* | 12/2009 | Amishima et al. | 709/238 |
| 2010/0087215 | A1* | 4/2010 | Gu et al. | 455/466 |
| 2010/0149600 | A1* | 6/2010 | Tanimoto | 358/400 |
| 2011/0264747 | A1* | 10/2011 | Mutikainen et al. | 709/206 |
| 2012/0258743 | A1* | 10/2012 | Kurokawa et al. | 455/466 |

FOREIGN PATENT DOCUMENTS

| EP | 2056557 A1 | 5/2009 |
| WO | WO2004098146 A1 | 11/2004 |

* cited by examiner

*Primary Examiner* — Shaq Taha
(74) *Attorney, Agent, or Firm* — Duft, Bornsen & Fettig, LLP

(57) ABSTRACT

Systems and methods are disclosed for providing a delivery status of a text message in a SIP response. In one embodiment, a text message system receives a SIP request from an entity in a packet-switched network, where the SIP request encapsulates a text message. The text message system determines a status for delivering the text message to a recipient, and generates a SIP response that includes a delivery status parameter for text messages. The text message system inserts the determined delivery status for the text message in the delivery status parameter of the SIP response, and transmits the SIP response to the entity over the packet-switched network.

20 Claims, 4 Drawing Sheets

DELIVERY REPORT FOR TEXT MESSAGES IN SIP COMMUNICATIONS

FIELD OF THE INVENTION

The invention is related to the field of communications and, in particular, to the delivery of text messages using Session Initiation Protocol (SIP).

BACKGROUND

Text messaging has become a very popular mode of communication in many wireless communication networks. One example of text messaging is Short Message Service (SMS), which is a set of communication protocols allowing the exchange of short text messages (i.e., 160 characters or less) between mobile devices. While the term "text message" traditionally referred to text-only messages sent using SMS, it has been extended to include multimedia messages, such as images, video, sound content, etc. The multimedia messages may be sent using Multimedia Message Service (MMS) protocol. Often times, mobile users more frequently use text messaging for communication than voice calls.

A sender of a new text message enters one or more intended destinations for the message in a user device (e.g., a phone), and also enters the content of the message. The user device of the sender formats the text message into the proper protocol, and sends the text message to a message center in the network over the appropriate signaling channels. One example of a typical message center is an SMS Center (SMSC). The SMSC then attempts to deliver the SMS message to its destination(s).

Many traditional mobile (wireless) networks are circuit-switched. For example, GSM (Global Systems for Mobile Communications) networks and CDMA2000 networks are types of circuit-switched networks. Network operators offer text messaging services over these types of circuit-switched networks. Other types of networks gaining popularity are packet-switched networks. IP Multimedia Subsystem (IMS) networks and Long Term Evolution (LTE) networks are two examples of packet-switched networks. Network operators are attempting to offer text messaging services over these types of networks also.

One type of signaling protocol used in packet-switched networks is Session Initiation Protocol (SIP). When sending a text message, the data for the text message is encapsulated in a SIP request, which is typically a SIP MESSAGE. The SIP request is then routed to the recipient, where an application in the recipient's device attempts to parse the text message included in the SIP request.

The technical specifications of the $3^{rd}$ Generation Partnership Project (3GPP and 3GPP2) have defined how text messages are exchanged over packet-switched (IP) networks. As part of these specifications, when a text message is delivered to a recipient, the recipient has to initiate a new SIP transaction to report back on the delivery success/failure of the text message. This methodology may cause problems in packet-switched networks when network operators attempt to offer text messaging to their customers.

SUMMARY

Embodiments described herein provide an improved way of reporting the delivery success/failure for a text message that is sent using SIP. When a text message is encapsulated in a SIP request, a system receiving the SIP request generates a SIP response. A prior system would send a SIP response indicating the delivery status of the SIP request only. Then the prior system would initiate a separate SIP transaction to report the delivery status of the text message itself. According to the embodiments herein, the system receiving the SIP request (which encapsulates a text message) generates a SIP response that indicates the delivery status of the text message that is encapsulated in the SIP request. The SIP response may be newly defined in SIP, such as a 7xx message. By including a delivery status of a text message in a SIP response, there is no need to initiate a separate SIP transaction to report the delivery status of the text message.

One embodiment comprises a text message system adapted to handle text messages over a packet-switched network. The text message system includes a network interface operable to receive a SIP request from an entity in the packet-switched network, where the SIP request encapsulates a text message. The text message system further includes a control system operable to determine a status of delivering the text message to a recipient. The control system is further operable to generate a SIP response that includes a delivery status parameter for text messages, and to insert the determined delivery status for the text message in the delivery status parameter of the SIP response. The network interface is further operable to transmit the SIP response to the entity over the packet-switched network.

In another embodiment, the SIP response comprises a SIP 700 response indicating a successful delivery attempt for the text message.

In another embodiment, the SIP response comprises a SIP 701 response indicating a failed delivery attempt for the text message.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
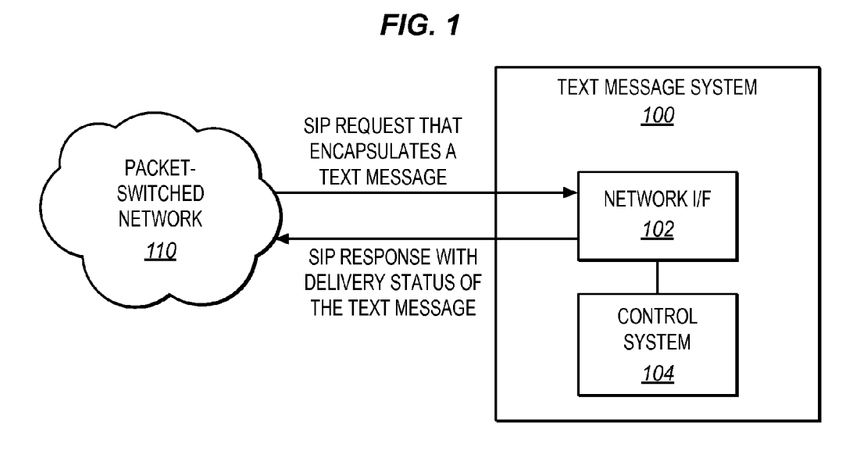
FIG. 1 illustrates a text message system in an exemplary embodiment.

FIG. 1 illustrates a text message system 100 in an exemplary embodiment. Text message system 100 comprises any server, gateway, end user device, or other system operable to handle text messages that are sent via Session Initiation Protocol (SIP) through a packet-switched network 110. For example, text message system 100 may comprise an end user device (or User Equipment (UE)) that is SIP enabled and includes an application that processes text messages that are received via SIP. In another example, text message system 100 may comprise a server, gateway, or some other system in a packet-switched network that receives a SIP request which encapsulates a text message, such as an application server or IP-SM-GW in an IMS network, or an LTE gateway that handles SMS. Text message system 100 is either part of a packet-switched network 110, or is coupled to a packet-switched network 110 (as shown in FIG. 1) in order to exchange SIP messages with entities (not shown) in packet-switched network 110. Packet-switched network 110 may comprise an IMS network, an LTE network, or any other IP-based network.

Text message system 100 includes a network interface 102 and a control system 104. Network interface 102 comprises any device or component adapted to communicate with one or more entities (not shown) in packet-switched network 110 using SIP. Although the entities are not specifically shown in FIG. 1, these entities may comprise application servers, Serving-Call Session Control Functions (S-CSCF), LTE gateways, or any other element that routes or generates text messages. Control system 104 comprises any device or component adapted to provide a delivery status for a text message that is encapsulated in a SIP request.

In the following embodiments, when text message system 100 receives a SIP request that encapsulates a text message from an entity in packet-switched network 110, system 100 is able to report a delivery status of the text message back to the entity in a SIP response. For example, text message system 100 is able to report whether the text message was successfully delivered to its intended recipient(s), or whether delivery failed. Reporting a delivery status in a SIP response, as described in the following embodiments, was not previously available for text messaging over packet-switched networks. As a background, there are a set of commands defined within SIP that are referred to as SIP requests or "methods". One such SIP request is a SIP MESSAGE that is used to transport instant messages, text messages, etc. SIP also defines a set of commands referred to as SIP responses. The SIP responses are used to respond to a particular SIP request. Some common SIP responses are 1xx, 2xx, 3xx, 4xx, 5xx, and 6xx.

Presently, when a SIP request is received that encapsulates a text message, the receiving device does not provide a delivery status of the text message in a SIP response. The receiving device provides a SIP response (acknowledgement) that the SIP request itself was received, such as in a SIP 200 OK. But this SIP response does not indicate whether the text message was successfully delivered to its recipient(s); it only indicates the delivery status of the SIP request. The receiving device has to initiate a new SIP transaction to provide a delivery status of text message by sending a separate SIP request that reports the delivery status. The embodiments provided below avoid having to initiate a new SIP transaction to report the delivery status of a text message because the delivery status is provided in a SIP response.

Figure 2:
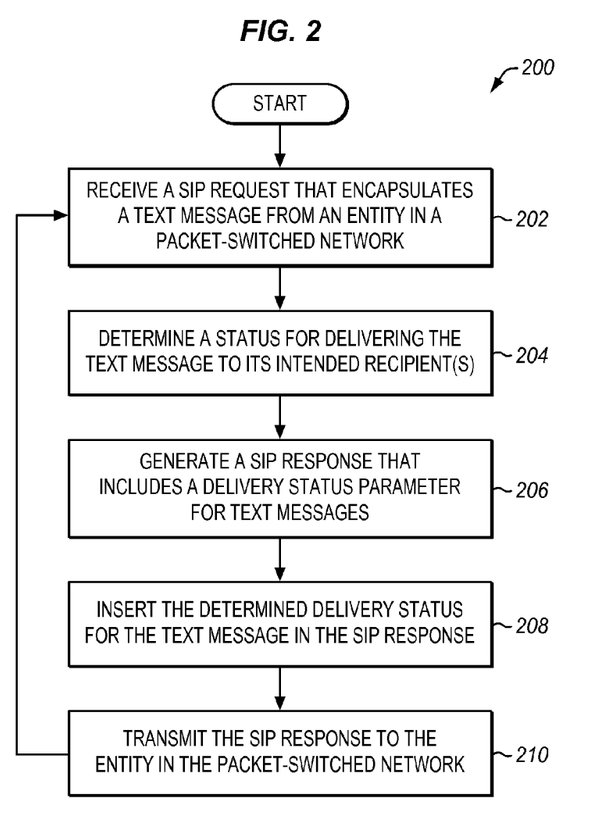
FIG. 2 is a flow chart illustrating a method of reporting the delivery status of a text message in an exemplary embodiment.

FIG. 2 is a flow chart illustrating a method 200 of reporting the delivery status of a text message in an exemplary embodiment. The steps of method 200 will be described with reference to text message system 100 in FIG. 1, but those skilled in the art will appreciate that method 200 may be performed in other networks and systems. The steps of the flow charts described herein are not all inclusive and may include other steps not shown. The steps may also be performed in an alternative order.

In step 202, network interface 102 receives a SIP request from an entity (not shown) in packet-switched network 110, where the SIP request encapsulates a text message. For example, the entity in packet-switched network 110 may comprise an end user device that sends a Mobile Originated (MO) text message in a SIP request. The entity in packet-switched network 110 may alternatively comprise a server or gateway that forwards a text message to system 100 in a SIP request. The SIP request may comprise a SIP MESSAGE or another type of SIP request that transports text messages (e.g., SMS messages).

In step 204, control system 104 determines a status for delivering the text message to a recipient, which is referred to as a delivery status of the text message. A delivery status comprises any information indicating the success or failure of delivering a text message to its intended recipient(s). The process used to determine the delivery status of a text message is beyond the scope of this application. However, in one example, if text message system 100 is implemented in an end user device, then control system 104 (or another system in the end user device) may parse the data for the text message to determine if there were addressing errors, formatting errors, or any other types of errors. If one or more errors are detected in parsing the text message, then control system 104 may determine that delivery of the text message has failed. If no errors are detected in parsing the text message, then control system 104 may determine that delivery of the text message was successful.

In step 206, control system 104 generates a SIP response that includes a delivery status parameter for text messages. The set of SIP responses presently available do not have a parameter defined for the delivery status of text messages. Thus, according to the embodiments provided herein, one or more new SIP responses are defined that include a delivery status parameter, which is used to indicate the status of delivering a text message to a recipient. These new SIP responses are discussed in more detail below. Although the term "parameter" is used herein, other terms such as header parameter, header field, header content, etc, may be used to describe the enhanced features of the SIP response.

In step 208, control system 104 inserts the determined delivery status for the text message in the delivery status parameter of the SIP response. Network interface 102 then transmits the SIP response to the entity over packet-switched network 110 in step 210. As is evident from the description above, the SIP response actually includes the delivery status of the text message. The SIP response may also indicate the delivery status of the SIP request. Because the SIP response includes the delivery status of the text message, a new SIP transaction (e.g., another SIP request) between text message system 100 and the entity in packet-switched network 110 is not needed to report the delivery status of the text message. This is advantageous for multiple reasons. For instance, when multiple SIP transactions are needed to report the delivery status of a text message, both the sender and receiver have to save relevant data about the two SIP transactions in order to correlate the SIP requests/responses from the two transactions. Also, the sender of the first SIP request may not be the same node that receives the second SIP request which reports the delivery status; thus correlation of the SIP transactions may be difficult. Reporting the delivery status of a text message in a SIP response (along with the status of the SIP request), as in the embodiments herein, allows for text messaging to be effectively implemented in packet-switched networks.

According to the embodiments herein, the SIP response commands (see RFC 3261) are enhanced to support new response codes/category for SIP requests that encapsulate text messages. One of the new SIP responses is a SIP 700 which indicates an attempt completed with a successful result. More particularly, the SIP 700 includes a parameter which indicates that the delivery of the text message was successful. The parameter in the SIP 700 may be populated with a variety of information indicating the success of delivery. One example of the information may be a MAP RP-ACK (either SMS-SUBMIT-REPORT for a Mobile Originated (MO) text message or SMS-DELIVER-REPORT for a Mobile Terminated (MT) text message).

Another one of the new SIP responses is a SIP 701 which indicates an attempt completed with an unsuccessful (failed) result. More particularly, the SIP 701 includes a parameter which indicates that the delivery of the text message failed. The parameter in the SIP 701 may be populated with a variety of information indicating the unsuccessful delivery. One example of the information may be a MAP RP-ERROR (either SMS-SUBMIT-REPORT for a Mobile Originated (MO) text message or SMS-DELIVER-REPORT for a Mobile Terminated (MT) text message).

Example

Figure 3:
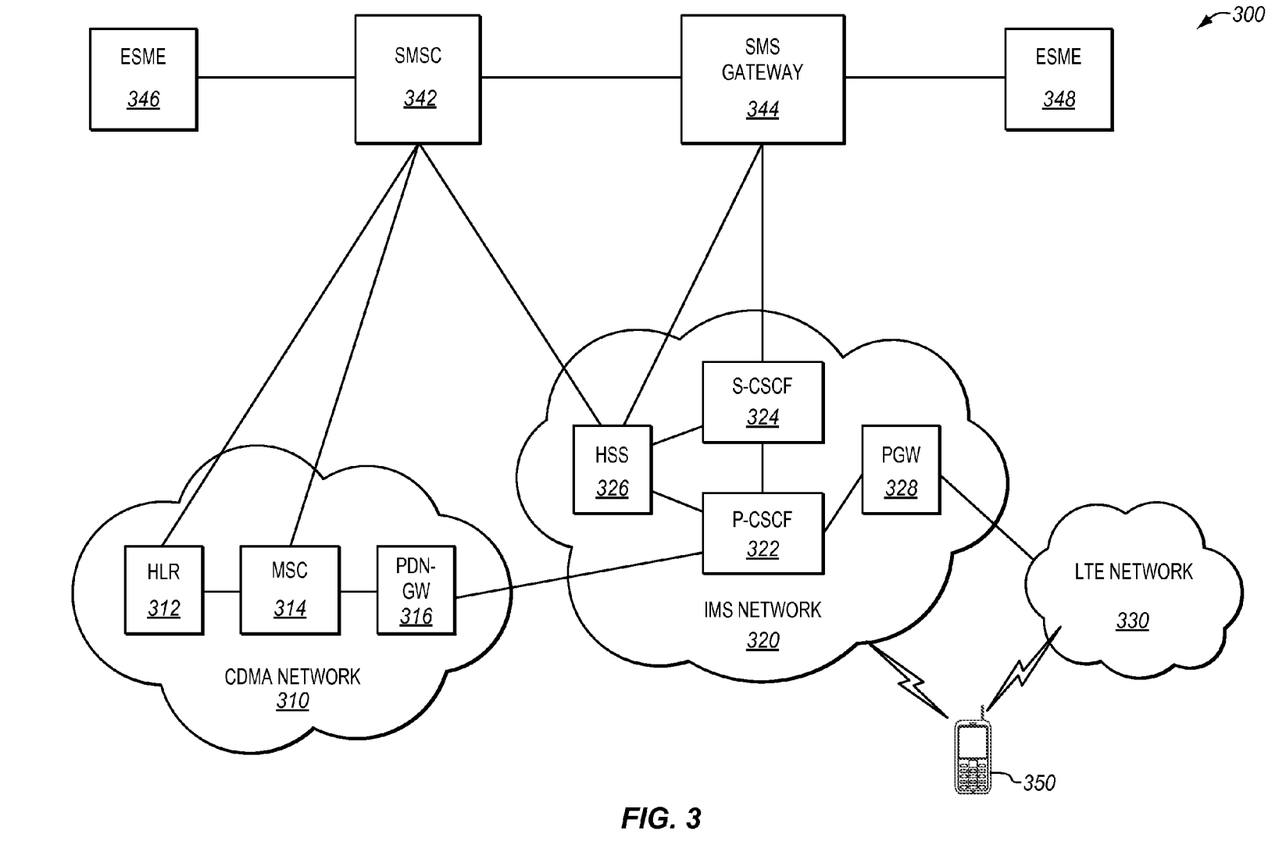
FIG. 3 illustrates a communication system in an exemplary embodiment.

FIG. 3 illustrates a communication system 300 in an exemplary embodiment. Communication system 300 includes multiple wireless communication networks, which are illustrated as CDMA network 310, IMS network 320, and LTE network 330 in this embodiment. The embodiments described below illustrate delivery of SMS messages to a mobile device 350 using SIP messages.

CDMA network 310 includes a Home Location Register (HLR) 312, a Mobile Switching Center (MSC) 314, and Packet Data Network Gateway (PDN-GW) 316. HLR 312 is a central subscriber database that stores subscription information and other details (e.g., subscriber profiles) of mobile devices that are authorized to use CDMA network 310. MSC 314 is the serving node for mobile devices, and is responsible for handling voice calls, SMS, and other services in CDMA network 310. PDN-GW 316 comprises any node or element in CDMA network 310 that interworks signaling between CDMA network 310 and a packet-switched network, such as IMS network 320. CDMA network 310 may include other network elements that are not shown for the sake of brevity, such as base stations, a radio network controller, etc.

IMS network 320 includes Proxy-Call Session Control Function (P-CSCF) 322, a Serving-Call Session Control Function (S-CSCF) 324, a Home Subscriber Server (HSS) 326, and a packet gateway (PGW) 328. P-CSCF 322 is the entry point to the IMS domain and serves as the outbound proxy server for IMS devices. S-CSCF 324 is the central node of the signaling plane, and performs session control for IMS devices that initiate sessions over IMS network 320. S-CSCF 324 communicates with IMS devices over one or more access networks that are not shown in FIG. 3. HSS 326 is a subscriber server that stores subscription-related information (e.g., subscriber profiles), performs authentication and authorization of end users, provides information about the subscriber's location, etc. PGW 328 comprises any node or element in IMS network 320 that exchanges packets with external networks.

The elements of LTE network 330 are not shown in this embodiment for the sake of brevity.

Communication system 300 also includes SMS Center (SMSC) 342 and a SMS gateway 344, which may comprise an LTE gateway, an IP Short Message Gateway (IP-SM-GW), or some other gateway that handles SMS over IP. SMS Center 342 comprises any node for a circuit-switched network that delivers SMS messages using store-and-forward processing. SMS gateway 344 comprises any node that interworks signaling between a SIP-based network and a network or device that uses a different signaling protocol. For example, if a network or device uses Short Message Peer-to-Peer (SMPP) protocol to exchange SMS messages, then SMS gateway 344 interworks the SMPP protocol messages to SIP and vice-versa. Communication system 300 also includes External Short Messaging Entities (ESME) 346 and 348. An ESME is an external application that connects to SMSC 342 or SMS gateway 344 to engage in the sending and/or receiving of SMS messages. Typical examples of ESMEs are systems that send automated marketing messages to mobile users, voting systems that process SMS votes, etc.

Assume for this embodiment that ESME 348 generates an SMS message that is intended for mobile device 350. The following embodiment illustrates how a delivery status is provided in a SIP response.

Figure 4:
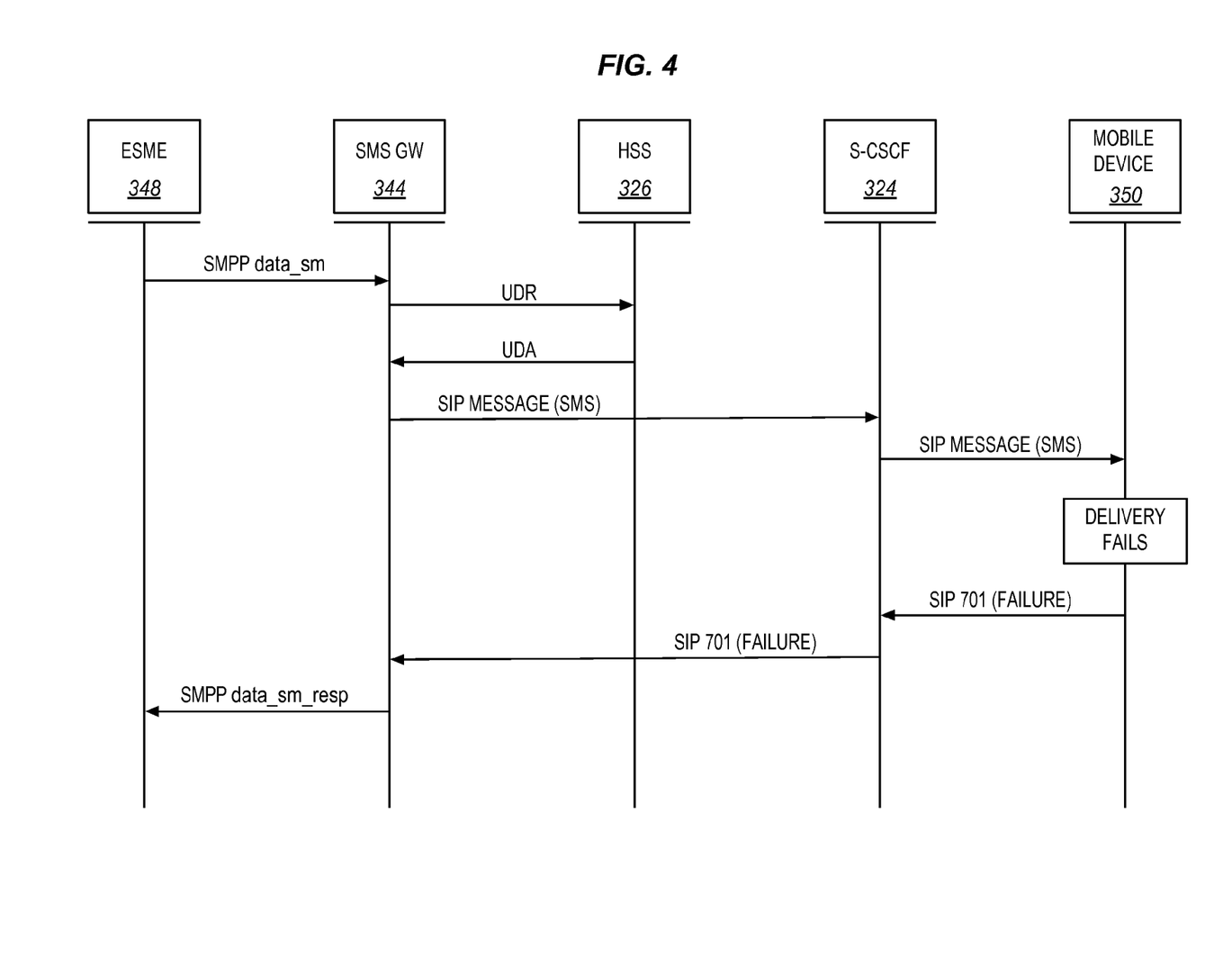
FIG. 4 is a message diagram illustrating a failed delivery of an SMS message in an exemplary embodiment.

FIG. 4 is a message diagram illustrating a failed delivery of an SMS message in an exemplary embodiment. As a reference, text message system 100 of FIG. 1 would be implemented in mobile device 350 in this embodiment. After ESME 348 generates the SMS message for mobile device 350, ESME 348 formats an SMPP protocol data_sm message and encapsulates the SMS message in the data_sm message. One assumption at this point is that ESME 348 is enabled for SMPP protocol. If not, an SMPP gateway may be implemented between ESME 348 and SMS gateway 344. ESME 348 then sends the data_sm message to SMS gateway 344. In response to the data_sm message, SMS gateway 344 queries HSS 326 for the registration status of mobile device 350 using a Diameter User Data Request (UDR). HSS 326 determines that mobile device 350 is registered, and responds to SMS gateway 344 with a Diameter User Data Answer (UDA) indicating that mobile device 350 is registered. SMS gateway 344 then constructs a SIP MESSAGE that encapsulates the SMS message. The SIP MESSAGE header may be constructed as follows:

```
MESSAGE tel:+19305020103 SIP/2.0
Via: SIP/2.0/UDP 135.1.62.120:5060;branch=z9hG4b
To: tel:+19305020103
From: tel:+19305020106;tag=1 (ESME Address - long code)
Call-ID: 689e5af4451c0170@livemas1
Max-Forwards: 70
CSeq: 1 MESSAGE
Route: LTE GW SIP URI
P-Charging-Vector=icid-value="PCSF:192.161.1.xxx-xxxxxxxx"
Content-Type: application/vnd.3gpp.sms
Content-Length: xx (Length of Relay Layer Message)
<<Encapsulated RP-DATA (SMS-DELIVER)>>
```

SMS gateway 344 then sends the SIP MESSAGE to S-CSCF 324 in IMS network 320. S-CSCF 324 in turn routes the SIP MESSAGE to mobile device 350. Mobile device 350 then attempts to parse the SMS message (RP-DATA) in the SIP MESSAGE. Assume for this embodiment that an error occurs for one or more reasons. Mobile device 350 consequently determines that delivery of the SMS message has failed. Mobile device 350 then generates a SIP 701 response that includes a parameter for the delivery status of the SMS message, and inserts an indication of the failed delivery in the parameter of the SIP 701 response. For example, mobile device 350 may insert an SMS-DELIVER-REPORT (see 3GPP TS 23.040) that includes a TP-Failure-Cause value indicating the reason for the failed delivery. The SIP 701 response may look as follows:

---
SIP/2.0 701 Attempted with unsuccessful result
Via: SIP/2.0/UDP 135.1.30.70:5080;branch=z9hG4bK287482662-1402101
Max-Forwards: 69
From: <sip:+19305020103@verizon.net; user=phone; lr>;tag=pctUA__287482662
To: LTE GW SIP URI
Call-ID: 287482662-1402079
CSeq: 1 MESSAGE
Content-Type: application/vnd.3gpp.sms
Content-Length: xx (Length of Relay Layer Message)
<<Encapsulated RP-ERROR (SMS-DELIVER-REPORT Message)>>
---

Mobile device 350 then routes the SIP 701 response to S-CSCF 324. S-CSCF 324 in turn routes the SIP 701 response to SMS gateway 344. SMS gateway 344 processes the SIP 701 response to identify the failed delivery (e.g., processes the TP-Failure-Cause value indicating the reason for delivery failure for the SMS message). SMS gateway 344 then maps the error code to an SMPP command_status result code in a data_sm_resp (if it is different protocol, there could be different mapping). Table 1 as provided below illustrates an example of error code mapping:

TABLE 1

| TP-Failure-Cause | SMPP result codes in Command_Status | SMPP delivery_failure_reason |
|---|---|---|
| Short message Type 0 not supported | 0x00000015 Invalid Service Type | N/A |
| Cannot replace short message | 0x00000013 Replace SM Failed | N/A |
| Unspecified TP-PID error | 0x000000FF Unknown Error | N/A |
| Unspecified TP-DCS error | 0x402 Unsupported Data Encoding | N/A |
| TPDU not supported | 0x409 Invalid Payload Type | N/A |
| SIM SMS storage full | 0x000000FE Delivery Failure | 0 = destination unavailable |
| No SMS storage capability in SIM | 0x000000FE Delivery Failure | 0 = destination unavailable |
| Error in MS | 0x000000FE Delivery Failure | 0 = destination unavailable |
| Memory Capacity Exceeded | 0x000000FE Delivery Failure | 0 = destination unavailable |
| SIM Application Toolkit Busy | 0x000000FE Delivery Failure | 0 = destination unavailable |
| SIM data download error | 0x000000FE Delivery Failure | 0 = destination unavailable |
| Values specific to an application | 0x00000015 Invalid Service Type | N/A |
| Unspecified error cause | 0x00000015 Invalid Service Type | N/A |
| Reserved (any hex values) | 0x00000015 Invalid Service Type | N/A |

SMS gateway 344 then sends the data_sm_resp message to ESME 348, which reports the failed delivery of the SMS message to ESME 348. In the embodiment in FIG. 4, the SIP 701 response actually includes the delivery status (failure) of the SMS message. Because the SIP 701 response includes the delivery status of the SMS message, mobile device 350 does not have to initiate a new SIP transaction (e.g., another SIP MESSAGE) in order to provide the delivery status of the SMS message to SMS gateway 344.

Figure 5:
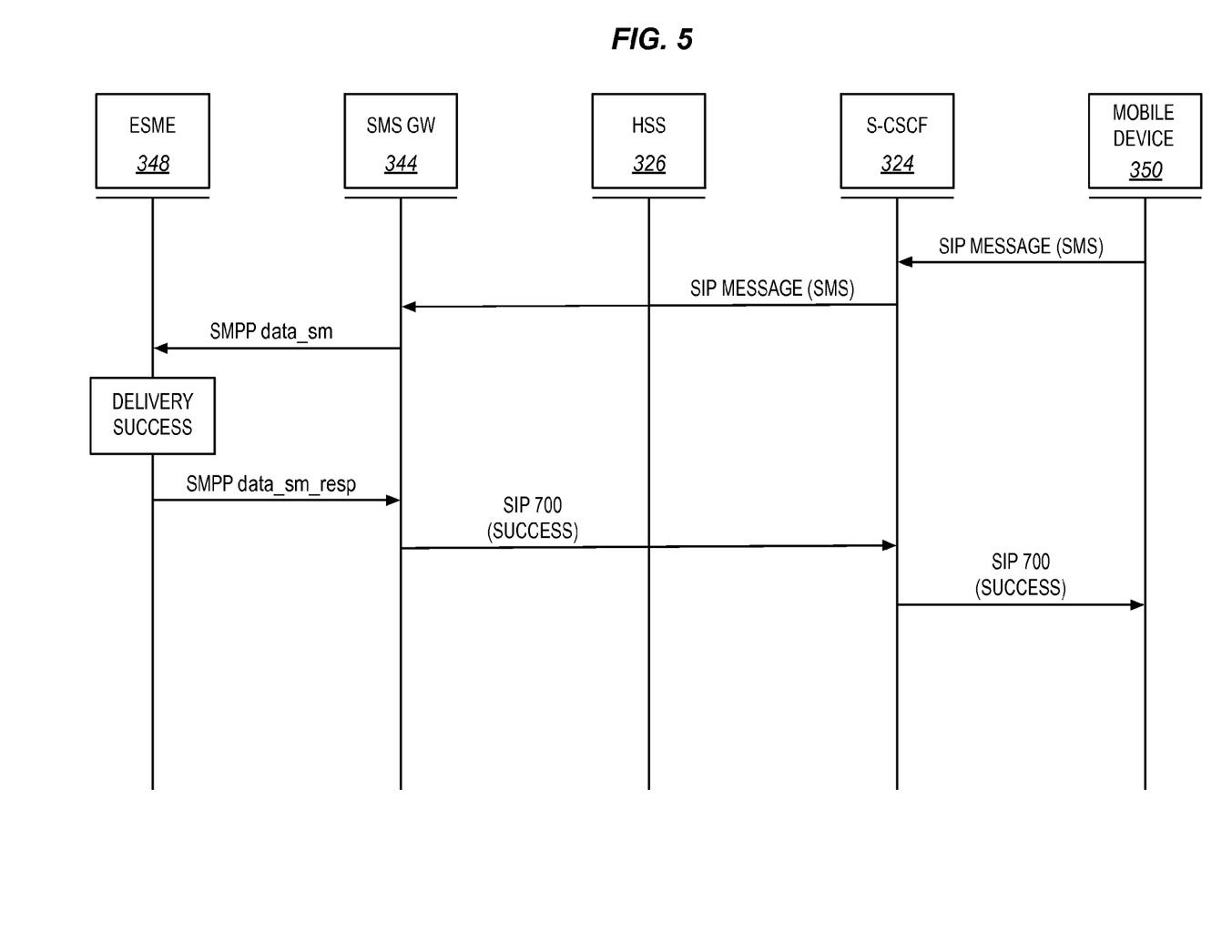
FIG. 5 is a message diagram illustrating a successful delivery of an SMS message in an exemplary embodiment.

Assume for another embodiment that mobile device 350 generates an SMS message that is intended for ESME 348. The following embodiment illustrates how a delivery status is provided in a SIP response.

FIG. 5 is a message diagram illustrating the successful delivery of an SMS message in an exemplary embodiment. As a reference, text message system 100 of FIG. 1 would be implemented in SMS gateway 344 in this embodiment. After mobile device 350 generates the SMS message for ESME 348, mobile device 350 formats a SIP MESSAGE and encapsulates the SMS message in the SIP MESSAGE. One assumption at this point is that mobile device 350 is SIP-enabled. The SIP MESSAGE may look as follows:

---
MESSAGE tel:+19305020103 SIP/2.0
Via: SIP/2.0/UDP 135.1.30.70:5080;branch=z9hG4bK287482662-1402101
Max-Forwards: 70
From: <sip:+19305020106@verizon.net; user=phone; lr>;tag=pctUA__287482662
To: LTE GW SIP URI
Call-ID: 287482662-1402079
CSeq: 1 MESSAGE
Route: LTE GW SIP URI
P-Asserted-Identity: <sip:+19305020106@somedomain.com>
P-Asserted-Identity: <tel:+19305020106>
Content-Type: application/vnd.3gpp.sms
Content-Length: xx (Length of Relay Layer Message)
<<Encapsulated RP-DATA (SMS-SUBMIT Message)>>
---

Mobile device 350 then sends the SIP MESSAGE to S-CSCF 324. In response to the SIP MESSAGE, S-CSCF 324 routes the SIP MESSAGE to SMS gateway 344. SMS gateway 344 retrieves the SMS message from the SIP MESSAGE by parsing the RP-DATA and SMS-SUBMIT PDU. SMS gateway 344 then generates an SMPP protocol data_sm message, and encapsulates the SMS message in the data_sm message. SMS gateway 344 sends the data_sm message to ESME 348 (assuming that ESME 348 is enabled for SMPP protocol).

In response to the data_sm message, ESME 348 attempts to parse the SMS message that is encapsulated in the data_sm message. Assume for this embodiment that the SMS message was delivered successfully to ESME 348. ESME 348 determines that delivery was successful, and generates an SMPP protocol data_sm_resp message with a successful result code. ESME 348 then routes the data_sm_resp message to SMS gateway 344.

SMS gateway 344 receives the data_sm_resp message, and processes the result to determine that the SMS message was successfully delivered to its recipient. SMS gateway 344 then generates a SIP 700 response that includes a parameter for the delivery status of the SMS message, and inserts an indication in the parameter that the delivery of the SMS message was successful. For example, SMS gateway 344 may insert an SMS-SUBMIT-REPORT (see 3GPP TS 23.040) that indicates a successful delivery. The SIP 700 response may look as follows:

---
SIP/2.0 700 Attempted with successful result
Via: SIP/2.0/UDP 135.1.30.70:5080;branch=z9hG4bK287482662-1402101
Max-Forwards: 69
From: <sip:+19305020106@verizon.net; user=phone; lr>;tag=pctUA__287482662
To: <sip:+19305020106@verizon.net; user=phone; lr>;
Call-ID: 287482662-1402079
CSeq: 1 MESSAGE

```
Content-Type: application/vnd.3gpp.sms
Content-Length: xx (Length of Relay Layer Message)
<<Encapsulated RP-ACK (SMS-SUBMIT-REPORT Message)>>
```

SMS gateway 344 then routes the SIP 700 response to S-CSCF 324. S-CSCF 324 in turn routes the SIP 700 response to mobile device 350, which reports the successful delivery attempt to mobile device 350. In the embodiment in FIG. 5, the SIP 700 response actually includes the delivery status (success) of the SMS message. Because the SIP 700 response includes the delivery status of the SMS message, SMS gateway 344 does not have to initiate a new SIP transaction (e.g., another SIP MESSAGE) in order to provide the delivery status of the SMS message to mobile device 350.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

We claim:

1. A text message system comprising:
a network interface configured to receive a Session Initiation Protocol (SIP) request that encapsulates a text message from an entity in a packet-switched network; and a control system including a processor configured to generate a SIP response for the SIP request indicating a delivery status of the SIP request to the text message system as successful;
the control system is further configured to determine a delivery status of the text message to a recipient;
the control system is further configured to insert an indication of the delivery status of the text message in a delivery status parameter of the SIP response so that the SIP response reports both the delivery status of the SIP request to the text message system and the delivery status of the text message to the recipient, wherein the delivery status of the text message indicates a successfully delivery to the recipient or a failed delivery;
the network interface is further configured to transmit the SIP response to the entity over the packet-switched network.

2. The text message system of claim 1 wherein: the SIP response comprises a SIP 700 response indicating a successful delivery attempt for the text message.

3. The text message system of claim 2 wherein: the control system is further configured to insert a Mobile Application Part (MAP) RP-ACK in the SIP 700 response indicating the successful delivery attempt for the text message.

4. The text message system of claim 1 wherein: the SIP response comprises a SIP 701 response indicating a failed delivery attempt for the text message.

5. The text message system of claim 4 wherein:
the control system is further configured to insert a Mobile Application Part (MAP) RP-ERROR in the SIP 701 response indicating the failed delivery attempt for the text message.

6. The text message system of claim 1 wherein: the delivery status of the text message comprises an SMS-SUBMIT-REPORT for a mobile originated (MO) text message.

7. The text message system of claim 1 wherein: the delivery status of the text message comprises an SMS-DELIVER-REPORT for a mobile terminated (MT) text message.

8. The text message system of claim 1 wherein: the network interface and the control system are implemented in an end user device.

9. The text message system of claim 1 wherein: the network interface and the control system are implemented in a Short Message Service Center (SMSC).

10. The text message system of claim 1 wherein:
the network interface and the control system are implemented in a Long Term Evolution Gateway (LTE GW) of an LTE network or an IP Short Message Gateway (IP-SM-GW) of an IP Multimedia Subsystem (IMS) network.

11. A method comprising:
receiving a Session Initiation Protocol (SIP) request that encapsulates a text message from an entity in a packet-switched network;
generating a SIP response for the SIP request indicating a delivery status of the SIP request to the text message system as successful;
determining a delivery status of the text message to a recipient;
inserting an indication of the delivery status of the text message in a delivery status parameter of the SIP response so that the SIP response reports both the delivery status of the SIP request to the text message system and the delivery status of the text message to the recipient, wherein the delivery status of the text message indicates a successfully delivery to the recipient or a failed delivery;
transmitting the SIP response to the entity over the packet-switched network.

12. The method of claim 11 wherein: the SIP response comprises a SIP 700 response indicating a successful delivery attempt for the text message.

13. The method of claim 12 wherein: inserting an indication of the delivery status of the text message comprises inserting a Mobile Application Part (MAP) RP-ACK in the SIP 700 response indicating the successful delivery attempt for the text message.

14. The method of claim 11 wherein: the SIP response comprises a SIP 701 response indicating a failed delivery attempt for the text message.

15. The method of claim 14 wherein:
inserting an indication of the delivery status of the text message comprises inserting a Mobile Application Part (MAP) RP-ERROR in the SIP 701 response indicating the failed delivery attempt for the text message.

16. The method of claim 11 wherein: the delivery status of the text message comprises an SMS-SUBMIT-REPORT for a mobile originated (MO) text message.

17. The method of claim 11 wherein: the delivery status of the text message comprises an SMS-DELIVER-REPORT for a mobile terminated (MT) text message.

18. A method comprising:
receiving, in a text message system, a Session Initiation Protocol (SIP) request that encapsulates a text message; and
transmitting a SIP response to the SIP request indicating a delivery status of the SIP request as successful,
wherein the SIP response reports both the delivery status of the SIP request to the text message system and the delivery status of the text message to a recipient,
wherein the delivery status of the text message indicates a successfully delivery to the recipient or a failed delivery.

19. The method of claim 18 wherein: the SIP response comprises a SIP 700 response indicating a successful delivery attempt for the text message.

20. The method of claim 18 wherein: the SIP response comprises a SIP 701 response indicating a failed delivery attempt for the text message.

\* \* \* \* \*